United States Patent [19]

Lynch

[11] Patent Number: 4,942,613

[45] Date of Patent: Jul. 17, 1990

[54] SERVICE THERMOSTAT

[75] Inventor: Gregory A. Lynch, Murfreesboro, Tenn.

[73] Assignee: Heil-Quaker Corporation, Laverqne, Tenn.

[21] Appl. No.: 279,419

[22] Filed: Dec. 2, 1988

[51] Int. Cl.$^5$ .............................................. G05B 23/00
[52] U.S. Cl. ................................... 364/557; 165/11.1;
340/825.06; 340/825.07; 340/825.08; 364/146
[58] Field of Search ................. 62/125, 126; 165/11.1,
165/11.2; 340/825.06, 825.07, 825.08; 364/145,
146, 557

[56] References Cited

U.S. PATENT DOCUMENTS

| | | | |
|---|---|---|---|
| 3,736,765 | 6/1973 | O'Dell | 62/125 X |
| 3,890,836 | 6/1975 | McKenzie et al. | 165/11.1 X |
| 4,146,085 | 3/1979 | Wills | 165/11.1 |
| 4,217,646 | 8/1980 | Caltagirone et al. | 364/145 X |
| 4,234,926 | 11/1980 | Wallace et al. | 364/900 X |
| 4,307,775 | 12/1981 | Saunders et al. | 165/11.1 |
| 4,426,850 | 1/1984 | Reedy | 62/125 |
| 4,591,093 | 5/1986 | Elliott Jr. | 236/94 |
| 4,819,714 | 4/1989 | Otsuka et al. | 364/557 X |

Primary Examiner—Parshotam S. Lall
Assistant Examiner—Edward R. Cosimano
Attorney, Agent, or Firm—Jeffers, Hoffman & Niewyk

[57] ABSTRACT

The present invention is a diagnosis and testing system for a temperature control system which includes a communication bus, a control processor, and a service thermostat. The communication bus is coupled to substantially all of the components of the system. The control processor initiates communication between components by sending a bus address over the bus. The control processor includes an address decoder for recognizing various bus address signals, including a normal thermostat bus address and a service thermostat bus address. The service thermostat has a switch, a processor, and a bus interface unit. The switch selects the operating mode of the service thermostat, e.g. either normal or service modes. The bus interface unit communicates over the bus for the service thermostat processor. The service thermostat processor operates the service thermostat and is adapted to communicate over the bus using a bus address according to the operating mode which is determined by the switch.

15 Claims, 1 Drawing Sheet

SERVICE THERMOSTAT

BACKGROUND OF THE INVENTION

The field of the invention is that of thermostats, more specifically service thermostats.

Thermostats are well known in the art. They operate to command a temperature control or conditioning system. During normal operation, thermostats function to maintain a desired ambient temperature. Based on the commands given by the thermostat, the temperature control system provides the specified desired ambient temperature.

Service thermostats operate similarly. Like conventional normal control thermostats, the service thermostat issues commands to the temperature control system. However, the service thermostat does not necessarily issue commands on the basis of a specified desired temperature. Rather, it issues commands according to the diagnostic efforts of a service technician.

One important distinction between the two types of thermostats involves the location of the thermostat user. For a control thermostat, a home owner sets the desired temperature in living areas, which are typically far from the system elements to be diagnosed. Service technicians monitor certain predefined temperature control operations where the machinery is located, normally outside the house, in garages or basements. Thus, a service person desires to operate the service thermostat relatively near the machinery being serviced. Having the flexibility of a service thermostat facilitates rendering service.

U.S. Pat. No. 4,146,085 (Wills) describes a service thermostat device. The system described in Wills has single lights which indicate the activity or inactivity of various heat pump components. Additionally, the Wills device has an ohm meter which checks the various sensors and also provides an indication of the temperature at various points in the system. The Wills device is used as a diagnostic tool which is dedicated to servicing. Further, the diagnostic thermostat described in Wills must be attached to the logic module (the temperature control system master controller). In effect, the Wills device replaces the sensor inputs to the logic module with its own inputs. Thus, when utilizing the Wills device, no temperature sensors are attached to the system.

Also, the diagnostic thermostat in Wills is designed for use in a single speed heat pump. Compared to a service thermostat needed for a single speed heat pump, variable speed equipment requires a much greater degree of complexity. A general computer could accomplish the service thermostat tasks, but this would entail a much greater expense than the usual service thermostat.

What is needed in the art is a service thermostat for a variable speed temperature control system. Additionally, what is needed in the art is a service thermostat which connects anywhere in the temperature control system. Further, a service thermostat is needed which can serve as a normal thermostat.

SUMMARY OF THE INVENTION

The present invention comprises a thermostat and a master processor for system servicing. The thermostat and master processor of the present invention extinguishes the need for a dedicated service device. The flexibility and convenience of servicing is facilitated by allowing coupling to any point along a temperature control system bus. Also, with one thermostat capable of operating as a normal or service thermostat, diagnostic procedures and troubleshooting methods are improved. These and other advantages will become apparent upon reading the following disclosure.

One object of the present invention is to provide the service thermostat for a variable speed temperature control system at a reasonable cost. Another object of the invention is to provide a service thermostat which can connect anywhere in the system. Also, an object of the present invention is to provide a service thermostat which can serve as a normal thermostat.

The present invention comprises a service thermostat which is adapted for use with a temperature control system having a communication bus. The current setting of a switch is used to indicate the operating mode of the thermostat (e.g., normal, service, etc.). The service thermostat also includes a processor with control circuitry for operating in the various modes. The thermostat includes a bus interface which is adapted for coupling to the system communication bus. The processor is adapted to send bus address signals via the bus interface. The bus address signal used by the processor depends on the current state of the mode switch.

In the temperature control system, a control processor coordinates communication along the system bus. The control processor also drives the various components of the system. Coupled to the control processor is an address decoder which recognizes the various bus addresses, including those of a normal and a service thermostat. When it observes a service thermostat bus address, the control processor ignores all other thermostats.

The thermostat shows the home owner the current utilization of the temperature control system with the speed bar graph displaying the current activity as a percentage of the system capacity. Single speed equipment is characterized by an on/off cycle with the on portion of the cycle accompanied by noises of operation. The variable speed system may appear inoperative because it may run at a small percentage of capacity. Conversely, the variable speed system may appear to work erroneously because of its constant operation. The present invention displays the actual utilization of the system capacity, allowing the home owner to evaluate accurately the activity of the system. Further details of a thermostat incorporating a speed bar display graph are disclosed in copending U.S. patent application entitled THERMOSTAT SPEED BAR GRAPH FOR VARIABLE SPEED TEMPERATURE CONTROL SYSTEM, Serial Number 278,789 filed on even date herewith and assigned to the assignee of the present invention, which disclosure is incorporated herein by reference.

The speed bar graph can also help with the diagnosis of problems involving temperature control systems. Tables of typical operating parameters for a given bar graph speed can be made by observing a properly operating temperature control system under a variety of circumstances. With such a table, a service person could quickly compare the operating parameters of a faulty temperature control system with a properly operating system for the given circumstances after observing the bar graph and tables.

Thus, the present invention presents a service thermostat which can serve at different locations within the temperature control system and as both a service and normal thermostat.

DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE INVENTION

Figure 1:
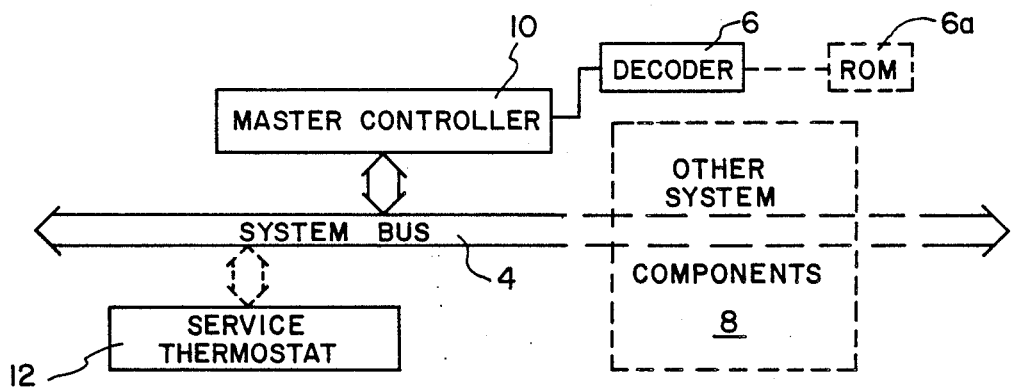
FIG. 1 is a schematic diagram of the connection between the service thermostat and the temperature control system of the present invention.

The service thermostat of the present invention appears in FIG. 1. Service thermostat 12 is shown coupled to system bus 4. Also shown in FIG. 1 is master controller 10, which is coupled to system bus 4. Master controller 10 includes an address decoder 6 which may optionally have a ROM memory 6a. A variety of temperature control elements are also coupled to system bus 4, the elements referred to in FIG. 1 as other system components 8. Other system components 8 may include, but are not limited by, the following devices: heaters, furnaces, air conditioners, heat pumps, blowers, thermostats, etc. The service thermostat 12 may be coupled to system bus 4 at any point along that bus. Thus, for a service person to diagnose a component of the system, the service person could couple service thermostat 12 directly at the bus near the component. The master controller 10 serves to command all the components of the temperature control system. While all of the other system components 8 can be accessed over system bus 4, master controller 10 may be directly coupled to some of the components 8.

Figure 2:
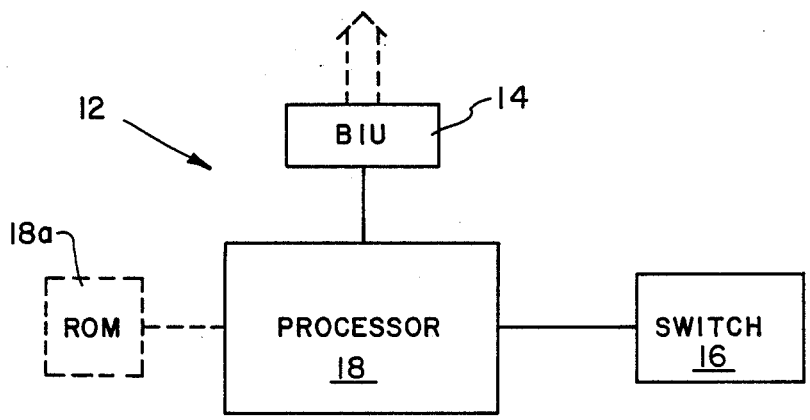
FIG. 2 is a schematic diagram of the service thermostat of the present invention.

A schematic diagram of the service thermostat of the present invention is depicted in FIG. 2. The service thermostat 12 is comprised of three elements: the bus interface unit (BIU) 14, switch 16, and processor 18. The service thermostat 12 may have additional components which both indicate the system status and allow for diagnostic programming. The service thermostat 12 is coupled to the system bus by BIU 14. Typically, every component of the temperature control system has a plug adapted for coupling with BIU 14. The BIU 14 is coupled with processor 18 so that processor 18 can send and receive messages by the system bus 4. The processor 18 is also coupled with switch 16, for use when the master controller 10 polls the system. Also, a ROM memory 18a may be included in Processor 18. While the system is polled, processor 18 determines the current state of switch 16 to determine what bus address to use, and the bus addresses may be stored in ROM 18a. In the preferred embodiment of the present invention, the master controller 10 polls by sending a request message specifying a bus address. Any element on the bus having the specified bus address replies to the request, thereby establishing communication.

Switch 16 controls the operating state of processor 18. For the service thermostat 12, at least two operating modes exist. One mode is the normal operating mode, and the other is the service mode. With only two modes, switch 16 may be one dual inline plug switch (DIP). However, is should be noted that the multiplicity of operating modes could be defined for processor 18 such as, for instance, a zone thermostat (i.e. one of several thermostats on the same bus each in control of a specific zone or area of a building or residence). For multiple modes, switch 16 requires multiple settings. This is accomplished by either a rotary switch or a number of binary switches. Further, the switch 16 need not be a physical switch. For example, switch 16 could be an erasable programmable read-only memory (EPROM). However, in the preferred embodiment, a discrete switch is chosen for ease of use.

Figure 3:
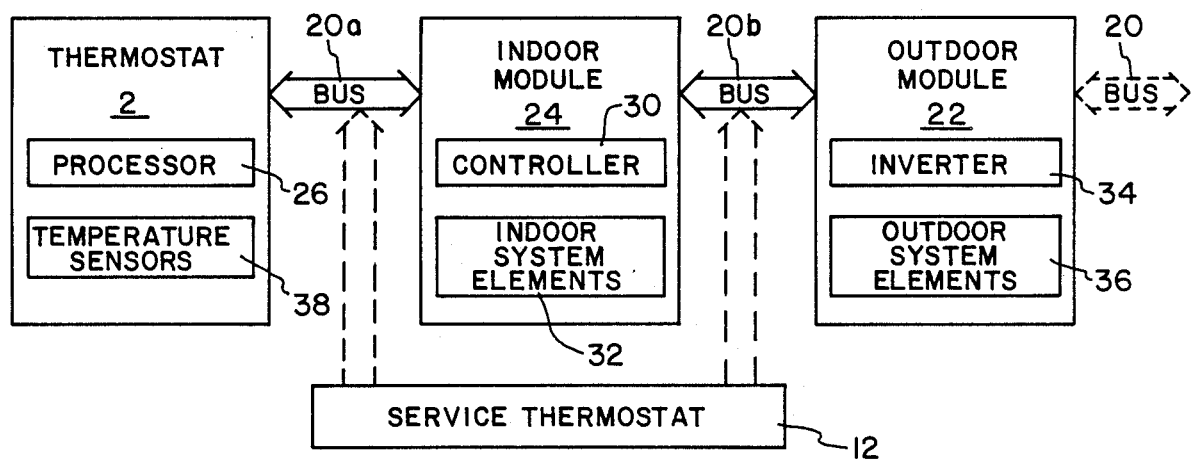
FIG. 3 is a schematic diagram of the preferred embodiment of the present invention.

A schematic diagram of the preferred embodiment of the present invention is shown in FIG. 3. Service thermostat 12 is shown coupled to either of the buses 20a or 20b. The service person using the service thermostat 12 determines where on either of buses, 20a or 20b, to attach the thermostat.

The system shown in FIG. 3 is controlled by master controller 30 located within indoor module 24. Master controller 30 directly drives the indoor system elements 32 which are located in indoor module 24. Master controller 30 sends and receives signals to thermostat 2 via bus 20a. Also, master controller 30 sends and receives signals over control bus 20b to outdoor module 22.

Thermostat 2 includes processor 26 and temperature sensors 38. The processor 26 determines the utilization ratio from the specified desired temperature as compared to the ambient temperature measured by temperature sensors 38. Processor 26 also sends that utilization ratio to master controller 30, when requested. In the preferred embodiment, the utilization ratio is represented by a number ranging from 0 to 200 which directly corresponds to percentages from 0 to 100.

The thermostat 2 is a microprocessor based thermostat specifically designed for use with variable speed temperature control systems. Any electronic thermometer can be used as the temperature sensors 38 in thermostat 2. Also, the thermostat 2 has a display device to present current conditions such as the desired temperature and the measured ambient temperature. The processor 26 performs both the thermostat control function and a display driver function.

The preferred embodiment of the present invention includes the ability to program the temperature control. Specifically, a homeowner can specify temperatures for different time periods on a 5 day - 2 day (week/weekend) cycle. The thermostat allows, by way of example, for up to 4 programs per day. Temperatures can be set within the range of 40° to 99° F., with a resolution of 1° F. Additionally, features such as computed energy management recovery, automatic mode changeover, hold temperature operation, and temperature override (two hours or until next time period) are included with the thermostat of the preferred embodiment.

Outdoor module 22 comprises inverter 34 and outdoor system elements 36. In the preferred embodiment, the outdoor module 22 is a microprocessor controlled induction inverter motor drive for a heat pump. An example of such an outdoor system includes a compressor, an inverter circuit specially designed for supplying power to the compressor, and a microprocessor operating the inverter circuit. The inverter 34 receives a utilization ratio from master controller 30. The utilization ratio received determines the speed of outdoor system elements 36.

The outdoor system elements 36 comprise a heat pump and additional circuitry for operating a refrigerant reversing valve and a fan on/off relay. Inverter 34 runs outdoor system elements 36. The inverter 34 takes a single phase AC current, rectifies it to DC, then chops and inverts the rectified DC current to produce current having a sinusodial waveform. The inverter 34 alters the frequency and voltage of the current supplied to the outdoor system elements 36 as specified by the utilization ratio received from master controller 30. The preferred embodiment of the present invention also allows for an optional two-speed fan and a defrost temperature switch in the outdoor module 22.

The temperature control system operates under the direction of master controller 30. Master controller 30 initiates a cycle by obtaining the utilization ratio from processor 26 via bus 20a. On the basis of the utilization ratio, master controller 30 directly drives various indoor system elements 32. In addition, master controller 30 sends inverter 34 instructions via bus 20b. Inverter 34 then provides the appropriate power level for the elements comprising outdoor system elements 36.

The control bus of the preferred embodiment of the present invention is an RS-485 "compatible" interface. The bus is a three wire bus having two differential lines and one common line. The two differential lines form a serial communication channel using a byte oriented master slave protocol. However, many types of communication buses and protocols can be used with the present invention. The master controller 30 initiates all communication upon the bus. The primary communication involves the processor 26 sending the utilization ratio to master controller 30 and master controller 30 sending that utilization ratio to inverter 34. However, master controller 30 also sends status information to processor 26 for display on the thermostat 2. Additionally, inverter 34 sends information about the status of the elements of outdoor system elements 36. Thus master controller 30 sends processor 26 information about both the status of outdoor system elements 36 and of indoor system elements 32.

Indoor module 24 has a microprocessor which functions as the system master. The master controller 30 monitors both the thermostat 2 and the outdoor module 22, controls the system communication bus, and provides the necessary commands to drive the temperature control system. In the preferred embodiment, the indoor system elements 32 comprise an indoor variable speed blower and an electric resistance heat control. The indoor variable speed blower operates as a function of compressor demand. However, when the electric resistance heat control operates under normal conditions, the indoor variable speed blower runs at its maximum speed. Also, master controller 30 can have a random access memory (RAM), read only memory (ROM), or both to store programming, bus addresses, communication protocols, or any combination thereof. The indoor system elements 32 could comprise many different combinations of temperature control elements.

The various components of the temperature control system identify themselves during the power up sequence performed by the controller 30. The controller 30 is adapted to operate with a service thermostat and also with a normal thermostat, although only one need be present. The controller 30 initiates a communication over the system bus by sending a request to a specific bus address. Each component of the system has its own bus address. A component only replies to controller 30 after sensing its bus address on the system bus. In the preferred embodiment of the present invention, the controller 30 only polls for a thermostat once—at initial power up. Upon returning to a power on condition, controller 30 sends the service thermostat bus address over the system bus. If the controller receives a reply from a service thermostat, the controller only communicates with the service thermostat. However, if no service thermostat replies, controller 30 polls for a normal thermostat. Assuming a normal thermostat is present on the system, controller 30 depends exclusively on the normal thermostat for command information.

The service thermostat is used to perform many functions. One function is to install system variables. For example, there are heat/cool/aux heat anticipation values, conditioned blower min/max speeds, and frost/defrost times which a variable speed heating/cooling system may require. Also, the service thermostat is used for user operation, e.g. setting times and desired temperatures. Another use of the service thermostat is to perform automatic test sequencing system confidence tests, tests which take system components from their minimum operating capacity to their maximum operating capacity. Still another function of the service thermostat is to perform manual test sequencing confidence tests, such as a service person would deem advisable while servicing the equipment. A service person could couple the thermostat with the system bus at either the indoor or outdoor modules components, with hard wiring also possible.

The present invention provides many advantages over the prior art. One advantage is eliminating the need for a special service device, as the service thermostat can also function as a replacement thermostat. In this manner, the same equipment needed to maintain the normal thermostat can be utilized to maintain the service thermostat. Also, the present invention increases the flexibility and convenience of servicing for the service person. A service person can operate the service thermostat at the same location as the component being tested. A further advantage of the present invention involves its ability to improve the diagnostic test and its trouble shooting ability. By having a coupling with the communication bus, it can both send control signals to controller 30 and observe any reply signals of any of the components of the temperature control system.

While this invention has been described as having a preferred design it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A thermostat, adapted for use with a temperature control system having a communication bus and a means for storing predetermined bus addresses, said thermostat comprising:
- switching means for selecting a desired one of a plurality of operating modes for said thermostat, said plurality of operating modes including a normal mode and a service mode;
- processing means coupled to said switching means, said processing means selectively affects one of said operating modes, based on the position of said switching means;
- bus interface means coupled to said processing means and said communication bus, said bus interface means communicating signals over said communication bus;
- said processing means adapted to communicate bus address signals via said bus interface means, using a bus address signal determined by the current state of said switching means.

2. The thermostat as described in claim 1 wherein said switching means comprises a dual in-line plug (DIP) switch for specifying a mode, including said normal mode and said service mode.

3. The thermostat as described in claim 1 wherein said processing means is programmed to operate in one of said normal mode and said service mode.

4. The thermostat as described in claim 1 wherein said bus interface means effects byte oriented serial communication on two differential lines.

5. The thermostat as described in claim 1 wherein said processing means includes a read only memory (ROM) to store said bus addresses.

6. In a temperature control system having a communication bus and means for storing predetermined bus addresses, a master processor comprising:
- a control processor for coordinating communication of bus address signals over said communication bus between various components of said system and said master processor;
- address decoder means, coupled to said control processor, for recognizing said bus address signals including a signal representative of a bus address for a control thermostat and a bus address for a service thermostat;
- said control processor having a means for directly driving said components of said system via said communication bus and ignoring any control thermostat when said address decoder means recognizes a signal from a service thermostat.

7. The master processor described in claim 6 wherein said control processor is programmed to communicate over said communication bus.

8. The master processor described in claim 6 wherein said address decoder means further comprises a read only memory (ROM) to store said bus addresses.

9. In a temperature control system with a means for storing predetermined bus addresses, a diagnosis and testing system comprising:
- a communication bus coupled to substantially all components of said temperature control system;
- a control processor coupled to said communication bus, said control processor initiating communication over said bus such that said control processor initiates bus communication by sending a bus address over said bus;
- a thermostat coupled to said communication bus having a switch, said switch determining one of a plurality of operating modes for said thermostat, said operating modes including a normal mode and a service mode, said thermostat using a normal thermostat bus address or service thermostat address depending upon the current state of said switch thereby determining which bus address to reply to; and
- said control processor configured such that, upon starting, said control processor sends said service bus address over said communication bus, wherein said control processor ignores any normal thermostats after receiving a reply to said service bus address.

10. A system as described in claim 9 wherein said switch is a dual in-line plug (DIP) for specifying either said normal mode or said service mode.

11. A system as described in claim 9 wherein said thermostat is programmed to operate in one of said normal mode and said service mode.

12. A system as described in claim 9 wherein said communication bus provides said system with byte oriented serial communication on two differential lines.

13. A system as described in claim 9 wherein said thermostat and said control processor include a read only memory (ROM) to store said bus addresses.

14. A system as described in claim 9 wherein said control processor is programmed to communicate over said communication bus.

15. A system as described in claim 9 wherein said thermostat is movable and can be coupled to said communication bus at any point on said bus.

* * * * *